UNITED STATES PATENT OFFICE.

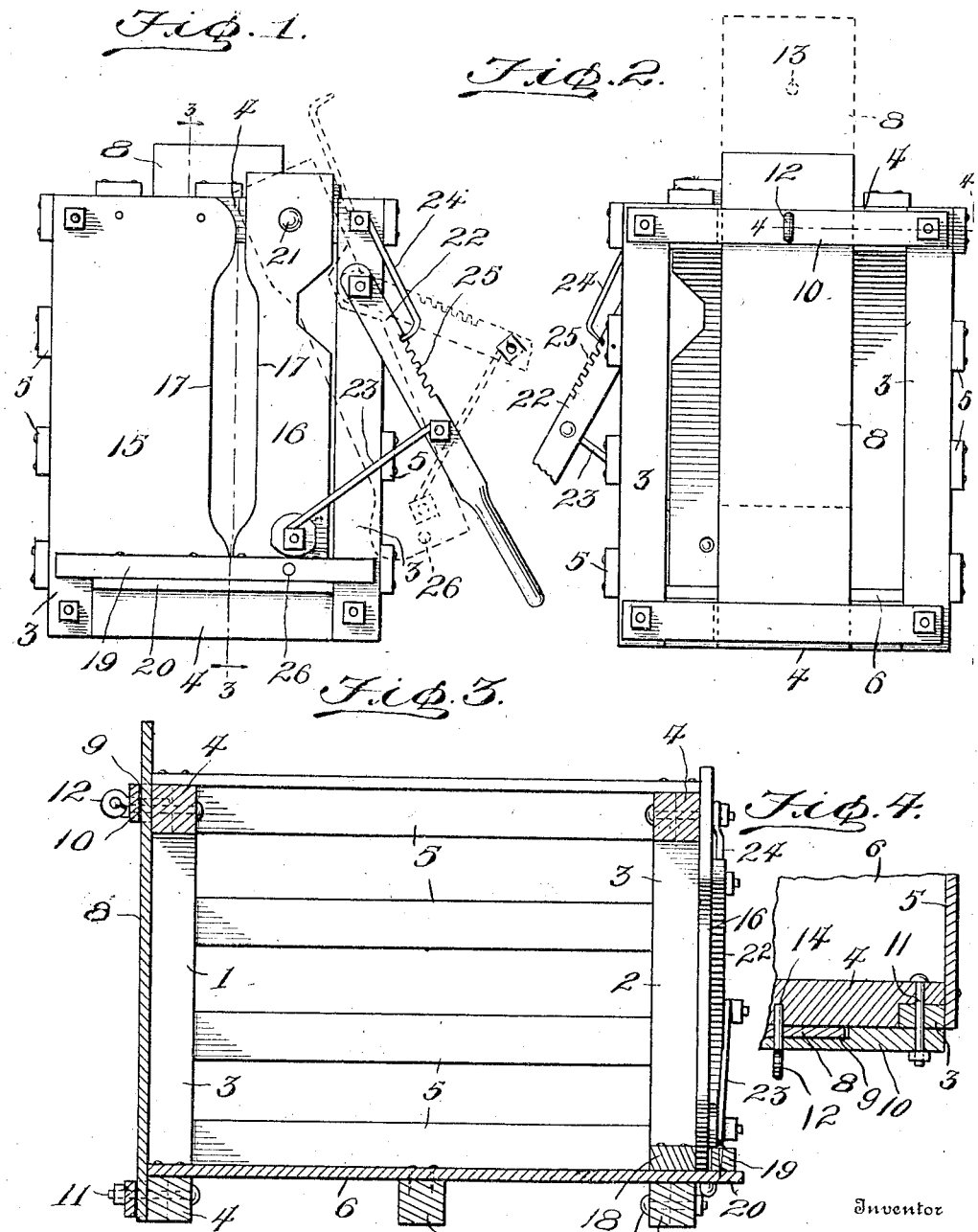

ARTHUR M. KENEIPP, OF OWENSVILLE, INDIANA.

CRATE.

No. 882,392.　　　Specification of Letters Patent.　　Patented March 17, 1908.

Application filed October 2, 1907. Serial No. 395,592.

*To all whom it may concern:*

Be it known that I, ARTHUR M. KENEIPP, a citizen of the United States, residing at Owensville, in the county of Gibson and State of Indiana, have invented new and useful Improvements in Crates, of which the following is a specification.

The invention relates to an improvement in crates, and particularly to a crate for the reception of animals such as hogs and so constructed as to permit the convenient transportation of the animal or the securing of the same to permit any necessary operation as ringing, tusking or the like.

The main object of the present invention is the provision of a crate containing a movable section which may be operated to trap and hold the head of the animal in a position convenient for the desired operation, the parts being so arranged that the section may be readily secured in normal or inoperative position to provide a transporting crate.

The invention will be described in the following specification, reference being had particularly to the accompanying drawings, in which:—

Figure 1 is an end elevation of a crate constructed in accordance with my invention, showing particularly the trapping means. Fig. 2 is a similar view of the opposite end of the crate, showing the gate or door through which the animal is admitted. Fig. 3 is a longitudinal section through the crate on the line 3—3 of Fig. 1. Fig. 4 is a section on line 4—4 of Fig. 2.

Referring particularly to the drawings my improved crate is made up of end frames 1 and 2 including side bars or uprights 3 and cross bars 4, the connections between these bars being of any appropriate character to maintain a strong rigid structure. The sides and top of the crate are preferably of headed construction, as at 5, while the bottom is preferably of a solid or platform type 6, the ends of the platform preferably resting upon the lower cross bars of the end frames and being centrally reinforced by a transverse bar 7 similar to the cross bars of the frame. The rear or entrance end of the crate is preferably closed by a gate or door 8, of any preferred detailed construction slidably mounted in recesses 9 formed by the relatively inner surfaces of cleats 10 secured to and overlying the upper and lower cross bars of the end frame 1. The ends of the cleats are preferably connected with the contacting ends of the uprights and cross bars of the end frame by bolts 11 passed entirely through said parts to provide a rigid structure. The gate is vertically slidable in the cleats 10, being secured in lowered position through the medium of a pin 12 passed through and opening in the cleat, an opening 13 in the gate and seating in a recess 14 in the upper cross bar of the rear frame, as clearly shown in Fig. 4. The forward end of the crate is provided with a trap, including a fixed section 15 and a movable section 16, the proximate edges of which are cut away at 17 to form an elongated opening, as shown in Fig. 1. The fixed section is secured between opposing cleats 18 and 19 secured directly upon the platform or bottom 6, the former overlying the lower cross bar of the forward end frame and the latter overlying and being secured to an extension 20 of the platform. The movable section 16 of the trap is pivotally secured at 21 to the upper cross bar of the forward end frame, the lower end being slidably disposed between the cleats 18 and 19. An operating lever 22 is mounted on the side bar of the end frame adjacent the movable section 16, and near the upper end of said side bar, said lever being connected intermediate its ends by a link 23 with the relatively lower end of the movable section 16. A gravity catch 24 is pivoted on the forward end frame above the lever, the hooked end of said catch being adapted to engage in one of a series of notches 25 formed in the relatively upper surface of the lever to secure the parts in desired position.

In operation the animal is driven through the chute or from any inclosure into the crate, the gate 8 having been elevated in an obvious manner. As the animal advances the lever 22 is moved on its pivot to space the section 16 of the trap from the section 15, thereby enlarging the elongated opening formed by the cutaway portion 17 of the respective sections. As the head of the animal projects through the opening thus provided the lever is moved in an opposite direction to narrow the opening and trap the animal by confining its neck in the elongated opening. In this position of the parts the catch 24 is caused to engage the proper notch 25 and the animal is secured in a position convenient for the necessary operation.

When not desired for use as a trap the lever and link 23 may be readily disconnected from the crate and a pin or bolt passed through openings 26 formed in the cleats 18 and 19 and in the lower or movable end of the section 16, thus utilizing said section as a fixed closure for the forward end of the crate, and confining the animal against escape.

Having thus described the invention what is claimed as new, is:—

1. A crate comprising an inclosed structure, a door at one end of the crate, and a trap at the opposite end, said trap comprising a fixed section and a movable section each of the full height of the interior of the crate, the proximate edges of the fixed section and movable section being cut away to form a trap opening when the sections are in operative position, the movable section being pivotally supported on the crate at the upper end of the latter, a lever mounted on the crate beyond the movable section, and means removably connecting the lever and the lower end of the movable section, said crate being provided with means for securing the movable end of the movable section in operative relation to the fixed section of the trap, whereby the lever and section connecting means may be removed from the crate and the movable section locked in position to close the end of the crate together with the fixed section.

2. A crate including a frame having closed sides top and bottom, a door movably mounted at one end of the crate for closing said end, a trap arranged to close the opposite end of the crate said trap comprising a fixed section and a movable section coöperating with the fixed section, the movable section being pivotally mounted on the crate frame at the upper end thereof, manually operable means engaging the lower end of the movable section to operate said section relative to the fixed section, cleats carried by the crate frame and arranged on opposite sides of the movable end of the movable section, said cleats and movable section being formed with openings adapted to register when the section is in closed position, and a pin arranged to be inserted through the registering openings, whereby the movable section may be adapted as a fixed part of the crate to form with the fixed section a closure for said crate end after the removal of the manually operable means.

In testimony whereof I affix my signature in presence of two witnesses.

ARTHUR M. KENEIPP.

Witnesses:
 GEO. B. BERESFORD,
 PORTER SHORT.